Figure 1:
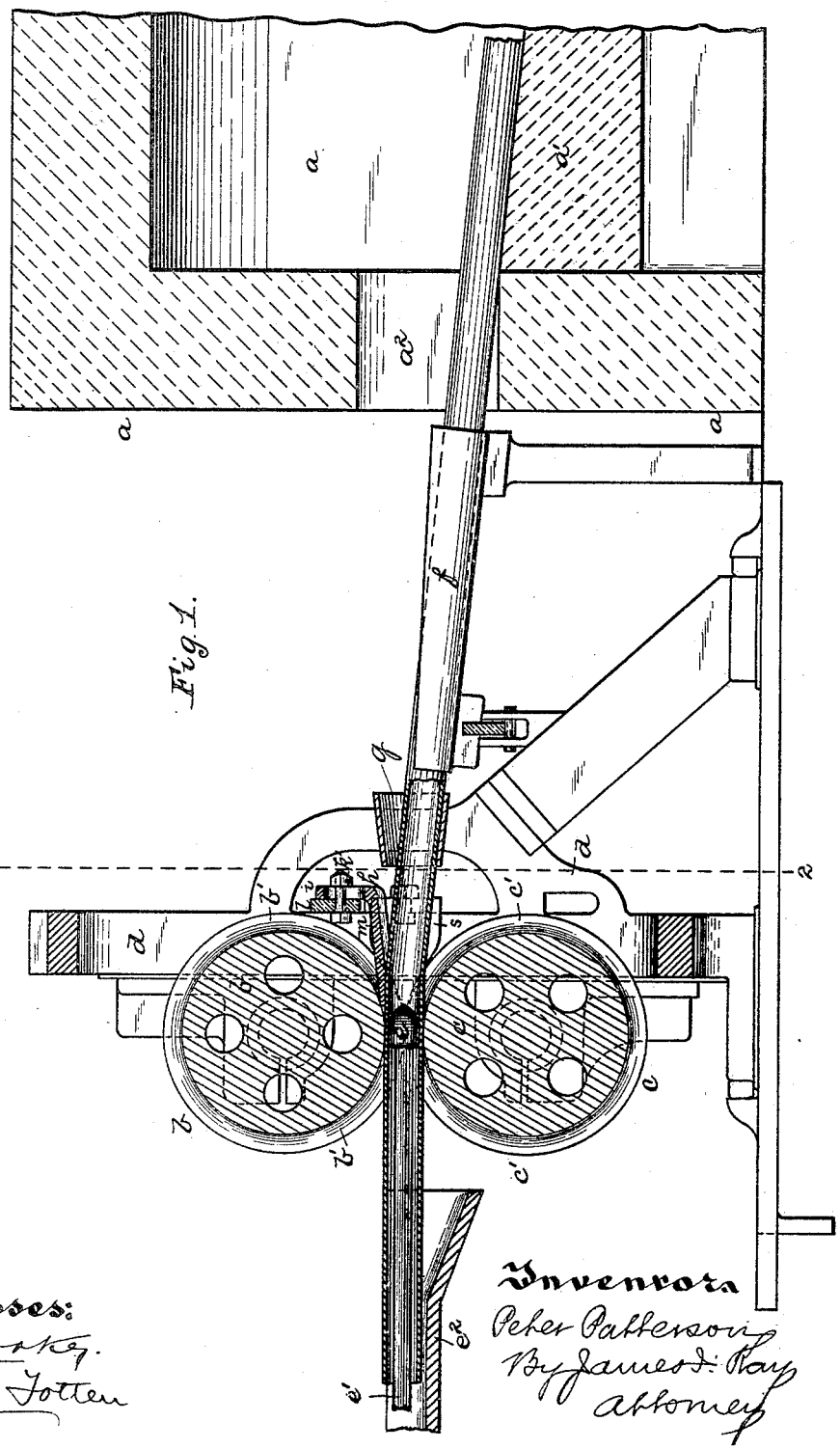

(No Model.) 2 Sheets—Sheet 1.

P. PATTERSON.
TUBE WELDING APPARATUS.

No. 442,454. Patented Dec. 9, 1890.

Witnesses:
J. N. Cooke
Robt. D. Totten

Inventor
Peter Patterson
By James T. Ray
Attorney (No Model.) 2 Sheets—Sheet 2.

P. PATTERSON.
TUBE WELDING APPARATUS.

No. 442,454. Patented Dec. 9, 1890.

Witnesses:
J. N. Cooke
Rob't D. Totten

Inventor
Peter Patterson
By James D. Ray
Attorney

UNITED STATES PATENT OFFICE.

PETER PATTERSON, OF McKEESPORT, PENNSYLVANIA, ASSIGNOR TO THE NATIONAL TUBE WORKS COMPANY, OF SAME PLACE.

TUBE-WELDING APPARATUS.

SPECIFICATION forming part of Letters Patent No. 442,454, dated December 9, 1890.

Application filed July 11, 1890. Serial No. 358,423. (No model.)

*To all whom it may concern:*

Be it known that I, PETER PATTERSON, a resident of McKeesport, in the county of Allegheny and State of Pennsylvania, have invented a new and useful Improvement in Tube-Welding Apparatus; and I do hereby declare the following to be a full, clear, and exact description thereof.

My invention relates to tube-welding apparatus, its object being to provide apparatus in the manufacture of lap-weld tubing for preventing what is called "stripping"—that is, the drawing apart of the two lapped edges of the tube-skelp before entering the rolls, thus causing an imperfect weld in the tube on account of not having a full lap of the edges of the skelp at a point on which the pressure is brought in the welding operation. In the welding of the lapped tube-skelp to form the tube the skelp is heated in a suitable furnace, and by pressure applied at the rear end it is forced through an opening in the end of the furnace over guides until the forward end of the lapped tube-skelp enters the pass within the welding-rolls formed by the semicircular grooves of the rolls and the welding ball or mandrel supported within the circular pass so formed, and the tube is grasped by the rolls and the lapped edges pressed thereby down upon the ball to form the weld. It often occurs that the forward end of the tube does not feed to the rolls perfectly, and as a consequence that the lapped edges slip or slide apart, so forming the stripping above referred to, and that this stripping action extends for a considerable length from the end of the tube, making such part thereof imperfect in weld, so that it is necessary to cut it from the finished tube. From this source, among others, the short lengths of tubing so objectionable in tube-making arise; and the object of my invention is to provide means for preventing this stripping and holding the lapped edges of the tube-skelp in proper line until caught by the welding-rolls, so that a perfect weld can be formed from the forward end through the entire tube.

To this end my invention consists, generally stated, in combining with the welding-rolls a pressure-guide supported in front of the rolls and having a presser-arm extending back toward the upper roll, and preferably into the groove thereof, and adapted to press upon and hold together the edges of the tube before it is grasped by the rolls and guide the upper edges of the tube properly to the welding-pass of the rolls, so preventing stripping and insuring the proper welding at the forward end of the tube.

The particular improvements forming the subject-matter of the application will be hereinafter more fully set forth and claimed.

To enable others skilled in the art to make and use my invention, I will describe the same more fully, referring to the accompanying drawings, in which—

Figure 2:
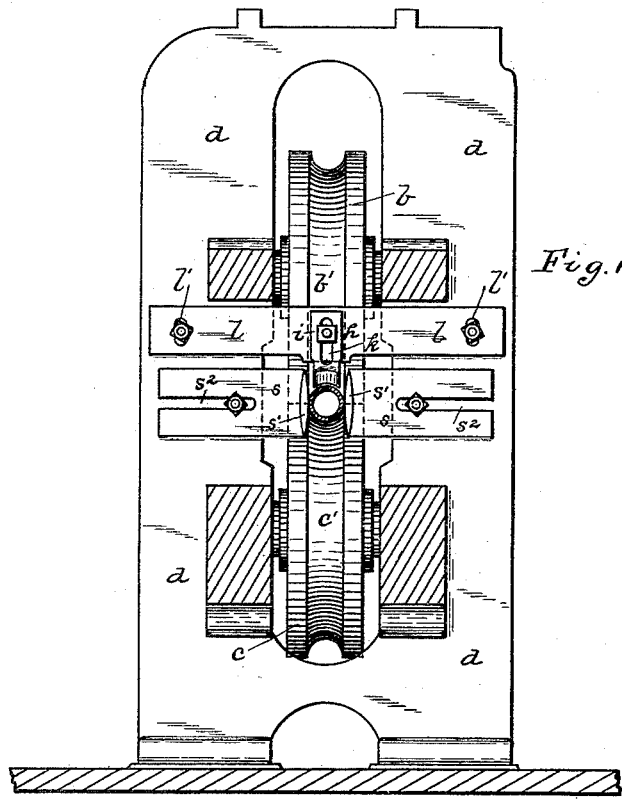
Figures 3, 4:
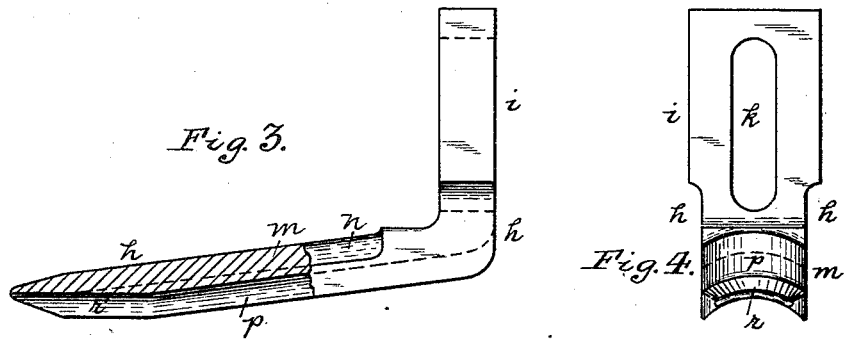

Figure 1 is a longitudinal section of a furnace and pair of welding-rolls. Fig. 2 is a cross-section on the line 2 2, Fig. 1. Figs. 3 and 4 are enlarged views of the pressure-guide forming the special subject of the application.

Like letters of reference indicate like parts in each.

The apparatus is shown as applied to an approved form of furnace and welding apparatus, though the invention may be employed with any suitable form thereof. As will be seen, the furnace $a$ has the hearth $a'$, over which the tube passes, the furnace having at the rear end the door or opening $a^2$, through which the tube is forced on its way to the welding-rolls. The welding-rolls $b$ $c$ are supported in the housings $d$, said housings having suitable bearings for the shafts or journals of the rolls, the same being shown in dotted lines and the rolls being mounted on the rear face of the housings. Back of the rolls $b$ $c$ is the trough $e^2$, over which the bar $e'$ passes, said bar carrying the welding-ball or mandrel $e$ within the circular pass formed between the grooves $b'$ $c'$ of the welding-rolls, such parts being of usual or any approved construction. The apparatus has also the usual guideway $f$ between the furnace-mouth $a^2$ and the housing over which the tube passes on its way to the welding-rolls, and the housing generally carries the conical guide $g$, which receives the tube from the guideway $f$ and holds it in proper line for passage to the pass of the rolls. It will be noticed that the hearth $a'$ and the guides $f$ and $g$ are on an incline, the tube-skelp being fed to the rolls at a slight upward incline, as it is found that the rolls grasp or receive it better when so fed and a more perfect and even weld is obtained. Above the course of the tube-skelp as it passes from the conical guide $g$ to the rolls I place the pressure-guide $h$, the construction of which is shown fully in Figs. 3 and 4, this pressure-guide consisting of the vertical portion $i$ and presser $m$, the vertical portion $i$ having a longitudinal slot $k$ formed therein, through which a bolt $k'$ passes to secure the pressure-guide to the plate $l$, which is bolted to the housings $d$ through slots $l'$, so providing for the accurate adjustment of the pressure-arm guide. The presser $m$ of the guide $h$ extends back from the body $i$ toward the upper roll just above the course of the skelp on its passage to the rolls and in position to press upon the upper face thereof and upon the lapped edges of the tube, and I prefer that the presser-arm $m$ shall extend back far enough to enter into the groove $b$ of the upper roll. The upper surface $n$ of the rear end of the presser $m$ is formed convex in cross-section, corresponding to the concave face of the groove $b'$, so that it may enter within the roll-groove close to the welding-ball $e$ and serve to guide the tube almost up to the point where it is grasped by the rolls and forced against said welding-ball. The lower surface $h$ of the pressure-guide is formed concave, corresponding, substantially, to the outer face or curve of the tube-skelp, for the purpose hereinafter described. The presser $m$ extends at a slight downward incline from the body portion $i$ toward the rear end thereof, when its lower concave face $p$ becomes substantially horizontal, as at $r$, so as to act as a bending guide to force the upper lap of the skelp onto the lower lap thereof and cause initial welding thereof, and also to bend the upper portion of the skelp into line with the pass of the rolls, as shown, the longitudinal concave face of the presser acting to press on the upper surface of the tube-skelp and hold it in proper line as it is fed to the rolls. This is more clearly shown in Fig. 3, where the lower part of the presser is shown in section. On each side of the housing $d$ in front of the rolls is secured the side guide $s$, these side guides having tongues $s'$, which pass in between the faces of the welding-rolls, their rear ends corresponding in shape to the rolls, so that they extend close to the point where the rolls grasp the tube. The faces $s'$ of these side guides are formed slightly inclined as they extend back between the rolls, so that they will serve to guide the tube into exactly the proper position for grasping by the rolls, as shown in Fig 2. These side guides $s$ can be adjusted horizontally by means of slots $s^2$, according to the size of pipe to be made and the extent which it is desired to confine the tube on its sides as it enters the rolls.

In the use of my invention, as the tube is forced by the workmen through the opening $a^2$ over the guide $f$ and through the guide $g$, its forward end is forced against the presser $m$ of the pressure-guide $h$. As the guide is arranged at a downward incline, while the tube moves forward at an upward incline, the forward end of the tube strikes the guide at a slight angle to its movement. In its first action the guide simply depresses the tube so as to guide it in proper line to the rolls; but such pressure on the upper surface of the tube also holds the edges of the skelp in proper line and forces the upper scarfed edge or lap down upon the lower scarfed edge or lap, and by the concave lower face $p$ of the pressure-guide it holds these two edges in line, preventing the spreading of the tube, and while the material is at a high welding heat bringing the edges of the scarf or lap into contact, so that there will be an initial weld formed between the two scarfed edges, and said scarfed edges will be held in proper line for feeding the rolls. As the skelp passes along said pressure-guide it enters the horizontal concave face $r$ at the lower end thereof and close to the welding-ball, and its upper edge is brought into the proper line for feeding to the pass of the rolls, so preventing the upper edge of the skelp from striking against the body of the roll in such way as to bend back the end of the tube and cause the stripping or opening of the lap. At the same time the sides of the blank are confined by the side guides $s$, while the concave face of the pressure-guide holds the upper part thereof in true line, and a perfect feeding of the forward end of the tube to the welding-rolls is thus obtained. Throughout the welding of a blank this action continues, so that the tube as it is drawn through by the rolls is held in proper line by the concave lower face of the pressure-guide. This guide causes the initial weld between the scarfed edges of the skelp, which weld is completed by the rolls pressing upon the welding ball or mandrel.

The operation of the apparatus is simple, while it entirely overcomes the stripping, the above-described very serious objection heretofore found in the making of lap-welded tubing, and at the same time it does not offer any obstruction to the skelp or create any kind of friction between the skelp and the welding apparatus, the pressure-guide being set at such a slight incline as to simply guide the tube in the proper direction, while when the tube strikes it the guide is so inclined as to create a pressure down upon the scarfed edges of the skelp sufficient to hold the said edges in proper line and to form the initial weld between the curved edges of the skelp. Practical use of the apparatus has shown that it overcomes all difficulties found in stripping in the manufacture of lap-welded tubing.

What I claim as my invention, and desire to secure by Letters Patent, is—

1. In apparatus for making lap-weld tubing, the combination, with the welding-rolls, of a pressure-guide supported in front thereof and having a presser-arm extending back toward the upper roll and adapted to press upon the upper face of the tube-skelp before it is grasped by the rolls, substantially as and for the purposes set forth.

2. In apparatus for making lap-weld tubing, the combination, with the welding-rolls, of a pressure-guide supported in front thereof and having a presser-arm extending back toward the upper roll, said pressure-guide having a concave lower face, substantially as and for the purposes set forth.

3. In apparatus for making lap-weld tubing, the combination, with the welding-rolls, of a pressure-guide supported in front thereof and having a presser-arm extending back at a downward incline toward the upper roll, substantially as and for the purposes set forth.

4. In apparatus for making lap-weld tubing, the combination, with the welding-rolls, of a pressure-guide supported in front thereof and having a presser-arm extending back toward the upper roll, its lower face being concave, and being first downwardly inclined, as at $p$, and then horizontal, as at $r$, substantially as and for the purposes set forth.

5. In apparatus for making lap-weld tubing, the combination, with the welding-rolls, of a pressure-guide supported in front thereof and extending back toward the upper roll, and side guides passing back between the faces of the rolls on each side of the pass thereof, substantially as and for the purposes set forth.

6. In tube-welding apparatus, the combination, with the welding-rolls, of the plate $l$, adjustably secured to the housing $d$, and the pressure-guide $h$, adjustably secured to the plate $l$ and having the presser-arm $m$ extending back toward the upper roll, substantially as and for the purposes set forth.

In testimony whereof I, the said PETER PATTERSON, have hereunto set my hand.

PETER PATTERSON.

Witnesses:
CHARLES PATTERSON,
H. R. MAZURIE.